April 30, 1957 R. S. ZEBARTH 2,790,199
POULTRY SCALDER HAVING EJECTING MEANS
Filed June 8, 1954 2 Sheets-Sheet 1

INVENTOR.
Ralph S. Zebarth
BY
ATTORNEY.

April 30, 1957     R. S. ZEBARTH     2,790,199
POULTRY SCALDER HAVING EJECTING MEANS Filed June 8, 1954     2 Sheets-Sheet 2

INVENTOR.
Ralph S. Zebarth
BY
ATTORNEY.

United States Patent Office 2,790,199
Patented Apr. 30, 1957

2,790,199

POULTRY SCALDER HAVING EJECTING MEANS

Ralph S. Zebarth, Hickman Mills, Mo., assignor to Gordon Johnson Equipment Company, Kansas City, Mo., a corporation of Missouri Application June 8, 1954, Serial No. 435,205

5 Claims. (Cl. 17—11.2)

This invention relates to equipment for processing poultry and particularly to a scalder having means for agitating the birds in the hot water, which agitating means is capable additionally of automatically ejecting the scalded poultry as the latter is dumped from a swingable receptacle within which the poultry is agitated.

It is the primary object of the instant invention to provide a poultry scalding machine embodying the principle of a swingable poultry-receiving receptacle or vat normally disposed within a tank of scalding water and provided with a manual control for swinging the vat to and from a position dumping the scalded poultry therefrom.

The most important object of the instant invention is the provision of a scalder provided with a rotatable agitator within the poultry-receiving vat so made, formed and disposed as a means of ejecting the birds when the vat is swung with respect to the tank to a dumping position.

Still another important object of this invention is to provide a scalder wherein the said poultry receptacle is especially formed through use of a plurality of transversely angled baffles so as to permit entrance of the scalding water thereinto when the receptacle is within the tank and yet to quickly and readily evacuate the water therefrom when the receptacle is swung to the dumping position.

Another important object of the instant invention is to provide structure as aforementioned, and including counterbalancing means operably coupled with the receptacle and including the power means for driving the agitator thereof to facilitate manual swinging of the receptacle to and from the dumped position.

The present invention contemplates still another important feature, namely, that of forming the agitator through use of a plurality of radial, offset arms made of tubular, flexible material with the arms beveled at the outermost ends thereof, all for the purpose of providing effective agitation as well as ejection and without damage to the birds being scalded.

Many additional objects include important details of construction for providing an inexpensive, easily operated, yet highly efficient scalding means for poultry and the like, all of which will be made clear or become apparent as the following specification progresses.

Figure 1:
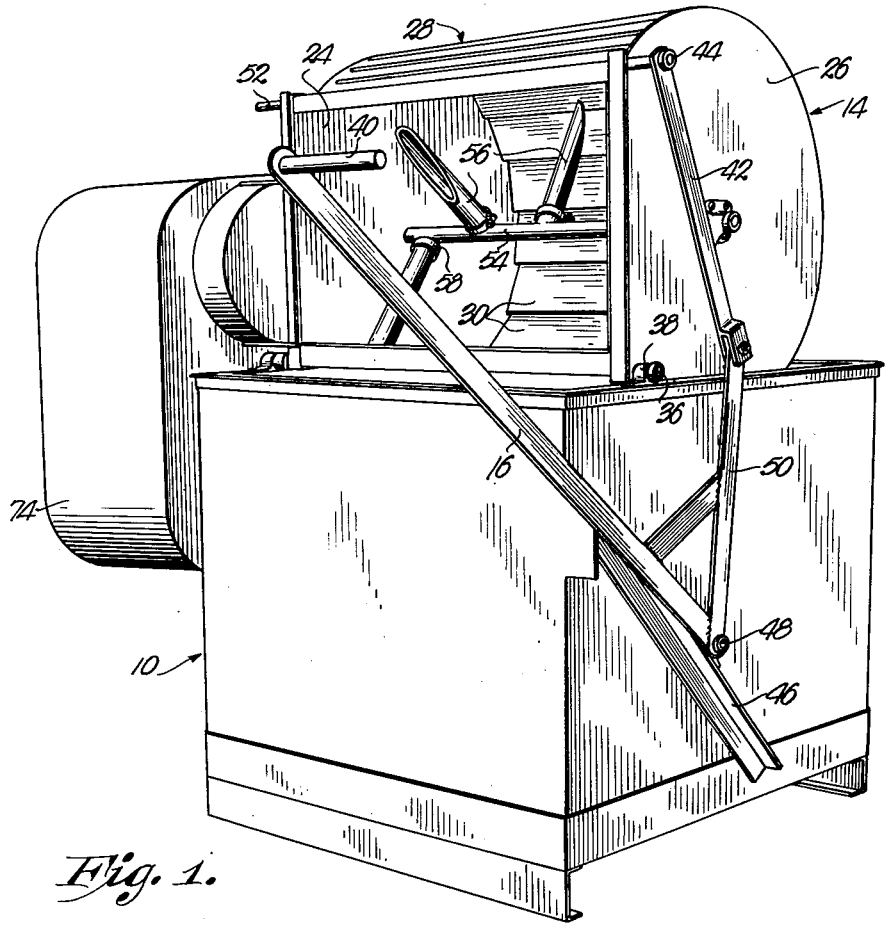
Figure 1 is a front perspective view of a scalder having poultry ejecting means made pursuant to the present invention showing the poultry-receiving receptacle in its dumping position.

The primary components of the scalder illustrated in the drawings include a hollow, open top tank 10 adapted to receive a scalding liquid such as water 12; an open top poultry-receiving vat or receptacle 14 swingably mounted on the tank 10; a manual control lever 16 operably coupled with the receptacle 14 for imparting swinging movement thereto; a combination agitator and ejector 18 rotatably mounted in the receptacle 14; counterweight means 20 connected with the receptacle 14; and a prime mover 22 forming a part of the counterweight means 20 and operably coupled with the agitator 18 to present a source of power therefor.

The receptacle 14 is of itself particularly novel because of the manner in which water 12 is caused to flow thereinto and empty therefrom as the receptacle 14 is swung on its horizontal axis. To this end, receptacle 14 includes a pair of end plates 24 and 26 and an arcuate bottom 28, the latter of which is composed of a plurality of elongated baffles 30 spanning the distance between the end plates 24 and 26 and rigidly connected thereto.

Figure 2:
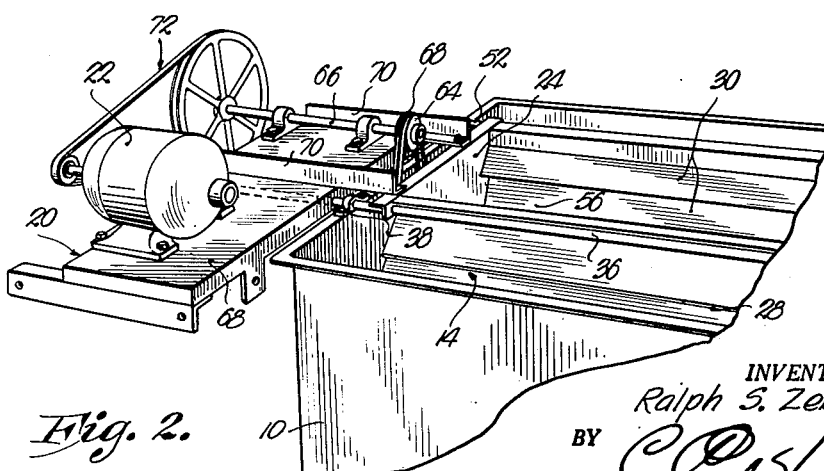
Fig. 2 is a fragmentary, top perspective view thereof showing the said receptacle within the liquid tank.
Figure 3:
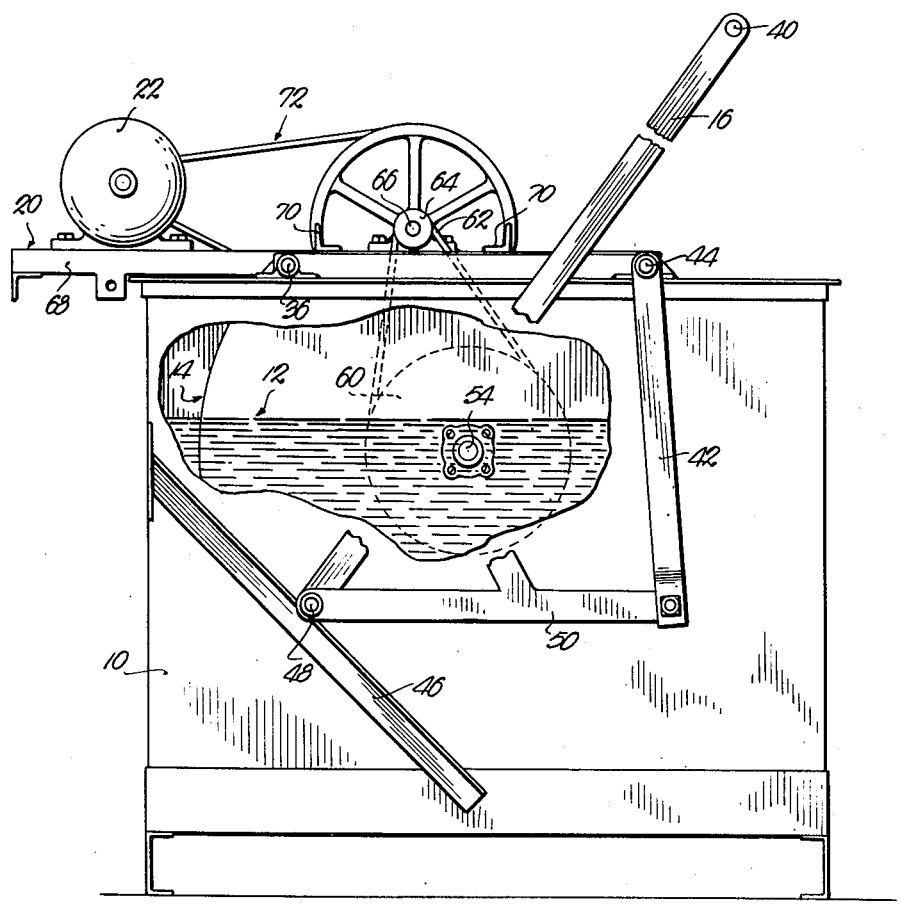
Fig. 3 is a side elevational view, parts being broken away for clearness.
Figure 4:
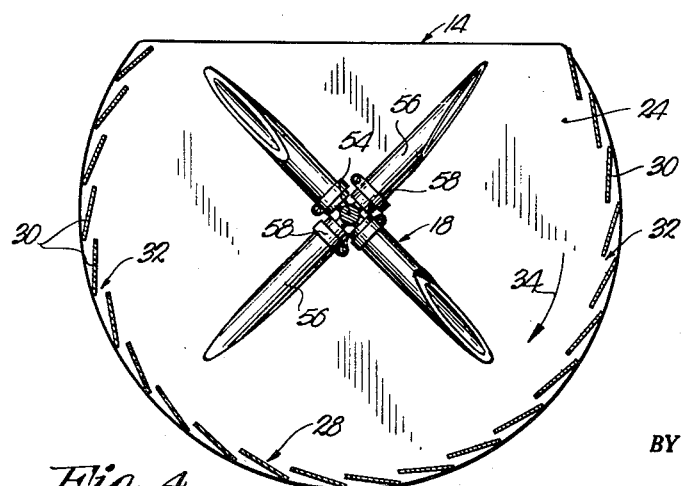
Fig. 4 is a vertical, transverse, cross-sectional view through the poultry-receiving receptacle and the agitator entirely removed from the liquid tank.

Notable particularly, is the fact that the baffles 30 are spaced-apart to present a number of openings 32 in the bottom 28 and are transversely angled in the direction of rotation of the agitating and ejecting means 18 as shown by arrow 34 in Fig. 4 of the drawings. Such positioning of the baffles or plates 30 forming the bottom wall 28 of receptacle 14, is important to free passage of water 12 into and out of the receptacle 14 as will hereinafter be clarified and, therefore, the direction of angling of the baffles 30 is opposite to the direction of swinging movement of the receptacle 14 from its position within the tank 10 as shown in Figs. 2 and 3, to the dumping position shown in Fig. 1.

An elongated shaft 36 extending along the uppermost and forwardmost edge of the receptacle 14 overlies the tank 10 and is carried by bearings 38 on the uppermost edge of tank 10, thereby mounting the receptacle 14 for swinging movement on a horizontal axis.

Lever 16 provided with a handle 40, effects swinging movement of the receptacle 14 through the medium of a link 42 pivotally connected to the receptacle 14 as at 44 adjacent the uppermost and rearmost edge of the latter. A suitable bracket 46 on the tank 10, swingably mounts the lever 16 on pivot pin 48 and the lowermost end of the link 42 is pivotally connected to an extension 50 rigid to lever 16. A stop end 52 on the receptacle 14 in opposed relationship to the pivot 44 rests upon the upper edge of tank 10 when the receptacle 14 is therewithin as seen in Fig. 2.

Agitator 18 includes a shaft 54 spanning the distance between the plates 24 and 26 and rotatably carried thereby. A plurality of tubular arms 56 are mounted on stubs (not shown) on the shaft 54 by clamps 58 and extend radially outwardly from the shaft 54. The arms 56 are made from a suitable flexible material such as rubber and are spirally offset throughout the length of the shaft 54, and it is to be noted further that the outermost ends of the hollow arms 56 are tapered. Arms 56 are also preferably offset so far as the positioning of the beveled ends thereof are concerned.

The shaft 54 extends beyond the plate 24 and receives a pulley 60 disposed between plate 24 and the proximal wall of tank 10 which receives a belt 62 that is also trained around a small pulley 64 on one end of an idler shaft 66.

Counterbalancing means 20 includes a relatively heavy platform 68 carried not only by the shaft 36, but by a pair of brackets 70 that connect with the uppermost edge of plate 24. Platform 68 not only supports the prime mover 22, but rotatably mounts idler shaft 66 and the latter is operably coupled with the prime mover 22 by belt and pulley means broadly designated by the numeral 72. Platform 68 also mounts a hollow housing 74 for prime mover 22 and the operable connection between the latter and agitating and ejecting means, housing 74 being removed in Figs. 2 and 3 of the drawings.

In operation, when the lever 16 is manipulated to lower the receptacle 14 from the position shown in Fig. 1, into the tank 10, the liquid 12 readily and quickly flows into the receptacle 14 through the openings 32 in bottom wall 28. It is easy to visualize how, as the receptacle 14 is rotated clockwise viewing Figs. 3 and 4, inclined or relatively angled baffles 30 effectively "cut" through the water 12 and thereby afford little or no resistance to immediate lowering of the receptacle 14 into the tank 10 and flow of the liquid 12 thereinto.

Prime mover 22 is energized continuously during the operation of the scalder to rotate the shaft 54 and when the receptacle 14 is in the position shown in Figs. 2 and 3, the poultry to be scalded is placed in the receptacle 14 through the open top thereof. The poultry tends to float in the water 12 and therefore, the radial arms 56 effectively and easily agitate the poultry through the water to properly and fully scald the same in a relatively short period of time.

It is notable in viewing Fig. 4 of the drawing that the baffle plates 30 are so disposed as to avoid any snagging of the agitated poultry with the plates 30 as the shaft 54 is rotated in the direction of arrow 34. The birds are not injured in any manner by the action of the arms 56 because of the flexibility of the latter, and little power is needed to rotate the shaft 54 since the arms 56 slide easily through the water and pass the birds because of the beveled outermost ends of the arms 56. In other words, by making arms 56 from tubular, flexible material, and by beveling the same as shown, there is little tendency for the poultry to become entangled therewith. Instead, the structure 18 gently, yet continuously moves the relatively buoyant poultry through the scalding liquid 12, thereby increasing the efficiency of the latter in effecting a proper scald.

After the scalding operation is completed the poultry may be quickly and easily dumped from the receptacle 14 by manipulation of lever 16 and here again, it is to be noted that as the receptacle 14 moves upwardly to the pumping position shown in Fig. 1, the baffle plates 30 slide easily through the scalding liquid and the receptacle 14 is immediately and quickly emptied of its water content and the water thereby offers no particular resistance to upward swinging movement of the receptacle 14 and its component parts. The ease of upward swinging of receptacle 14 is enhanced by the aid of counterweight means 20 and the latter also tends to hold the receptacle 14 in the dumping position while the rotating structure 18 ejects the birds from the receptacle 14.

The angularity of the baffles 30 is such as to avoid any impedance of the sweeping action of the rotating arms 56 in ejecting the birds from the receptacle 14, while it remains in the dumping position shown in Fig. 1. Any tendency of the birds to temporarily resist outward ejection causes the arms 56 to readily yield and, here again, preventing any damage to the poultry during the removal step.

While many details of construction have necessarily been set forth with particularity in the above description, it is to be appreciated that such changes and modifications as fairly come within the spirit of this invention are contemplated hereby and it is, therefore, desired to be limited only by the scope of the appended claims.

Having thus described the invention what is claimed as new and desired to be secured by Letters Patent is:

1. A poultry scalder comprising an open top liquid tank; an open top poultry-receiving receptacle normally within the tank and having openings for passage of water thereinto from the tank; means rotatably carried by the receptacle for agitating the poultry in the water and for ejecting the poultry from the receptacle when the latter is in said dumping position; means adjacent one uppermost edge of said receptacle mounting the same on the tank for swinging movement on an axis substantially parallel with the axis of rotation of said agitating and ejecting means to and from a position dumping poultry therefrom; and counterweight means mounted on said receptacle for facilitating the dumping thereof.

2. A poultry scalder comprising an open top liquid tank; an open top poultry-receiving receptacle normally within the tank and having openings for passage of water thereinto from the tank; means rotatably carried by the receptacle for agitating the poultry in the water and for ejecting the poultry from the receptacle when the latter is in said dumping position; means adjacent one uppermost edge of said receptacle mounting the same on the tank for swinging movement on an axis substantially parallel with the axis of rotation of said agitating and ejecting means to and from a position dumping poultry therefrom; counterweight means mounted on said receptacle for facilitating the dumping thereof; a prime mover mounted on and forming a part of said counterweight means; and structure carried by the receptacle and operably connecting the prime mover with said agitating and ejecting means.

3. A poultry scalder comprising an open top liquid tank; an open top poultry-receiving receptacle normally within the tank and having openings for passage of water thereinto from the tank; means rotatably carried by the receptacle for agitating the poultry in the water and for ejecting the poultry from the receptacle when the latter is in said dumping position; means adjacent one uppermost edge of said receptacle mounting the same on the tank for swinging movement on an axis substantially parallel with the axis of rotation of said agitating and ejecting means to and from a position dumping poultry therefrom; a dumping lever; means swingably mounting the lever on the tank; and linkage pivotally connecting the lever with the receptacle adjacent the opposite uppermost edge of the latter for dumping the receptacle as the lever is swung in one direction.

4. A poultry scalder comprising an open top liquid tank; an open top poultry-receiving receptacle normally within the tank; means rotatably carried by the receptacle for agitating the poultry in the water and for ejecting the poultry from the receptacle when the latter is in said dumping position; and means mounting said receptacle for movement to and from a position dumping poultry therefrom, said receptacle having a bottom wall composed of a plurality of baffles spaced-apart for passage of water into the receptacle from the tank, said baffles being transversely angled in the direction of rotation of said agitating and ejecting means.

5. A poultry scalder comprising an open top liquid tank; an open top poultry-receiving receptacle normally within the tank; means rotatably carried by the receptacle for agitating the poultry in the water and for ejecting the poultry from the receptacle when the latter is in said dumping position; and means mounting said receptacle on the tank for swinging movement on an axis substantially parallel with the axis of rotation of said agitating and ejecting means to and from a position dumping poultry therefrom, said receptacle having a bottom wall composed of a plurality of baffles spaced-apart for passage of water into the receptacle from the tank, said baffles being transversely angled in the direction of rotation of said agitating and ejecting means, and opposite to the direction of swinging movement of the receptacle to said dumping position.

References Cited in the file of this patent

UNITED STATES PATENTS

| Number | Name | Date |
| --- | --- | --- |
| 71,434 | White | Nov. 26, 1867 |
| 2,637,066 | Johnson | May 5, 1953 |

FOREIGN PATENTS

| Number | Country | Date |
| --- | --- | --- |
| 366,185 | Germany | Dec. 30, 1922 |
| 22,639 | Netherlands | July 16, 1930 |
| 66,029 | Norway | Mar. 29, 1943 |